United States Patent
Ito et al.

(10) Patent No.: US 9,939,925 B2
(45) Date of Patent: Apr. 10, 2018

(54) BEHIND-DISPLAY USER INTERFACE

(71) Applicant: Adobe Systems Incorporated, San Jose, CA (US)

(72) Inventors: Daichi Ito, Los Gatos, CA (US); Nathan Carr, San Jose, CA (US); Naoki Sasaki, Kawasaki (JP)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/090,011

(22) Filed: Nov. 26, 2013

(65) Prior Publication Data

US 2015/0145773 A1    May 28, 2015

(51) Int. Cl.
| | |
|---|---|
| *G06F 3/0346* | (2013.01) |
| *G06F 3/00* | (2006.01) |
| *G06F 3/03* | (2006.01) |
| *G06F 3/0481* | (2013.01) |
| *G06F 3/0354* | (2013.01) |

(52) U.S. Cl.
CPC ............ *G06F 3/0346* (2013.01); *G06F 3/005* (2013.01); *G06F 3/0304* (2013.01); *G06F 3/03545* (2013.01); *G06F 3/04815* (2013.01)

(58) Field of Classification Search
CPC .......... G09G 2300/023; G09G 2360/04; G06F 3/033; G06F 3/041; G06F 3/042; G06F 3/0346; G06F 3/0354; G06F 19/3437; G06F 3/005; G06F 3/0304; G06F 3/04815; G06F 3/03545
USPC .......................... 345/156–159, 175–179, 419
See application file for complete search history.

(56) References Cited

U.S. PATENT DOCUMENTS

| | | | | |
|---|---|---|---|---|
| 2003/0058241 A1* | 3/2003 | Hsu | ................................ | 345/426 |
| 2003/0085866 A1* | 5/2003 | Bimber et al. | ................ | 345/156 |
| 2010/0053151 A1* | 3/2010 | Marti | ...................... | G06F 3/011 |
| | | | | 345/419 |
| 2010/0222110 A1* | 9/2010 | Kim et al. | ..................... | 455/566 |
| 2010/0229090 A1* | 9/2010 | Newton | ................ | G06F 3/0428 |
| | | | | 715/702 |
| 2010/0277439 A1* | 11/2010 | Charlier et al. | ............... | 345/176 |

(Continued)

OTHER PUBLICATIONS

"Bridging the Gap Between Real and Virtual World", [Online]. Retrieved from the Internet: http://leonar3do.com>, (2012), 3 pgs.

(Continued)

*Primary Examiner* — Jennifer Mehmood
*Assistant Examiner* — James Nokham
(74) *Attorney, Agent, or Firm* — Shook, Hardy & Bacon LLP

(57) ABSTRACT

Example systems and methods of providing a user interface are presented. In one example, a graphical object is displayed on an opaque display component on a user-facing side of a computing device. Using a sensing component of the computing device, movement of a physical pointer controlled by a user is sensed. The physical pointer may be located opposite the user-facing side of the computing device. On the opaque display component, a representation of the physical pointer is displayed during the movement of the physical pointer. The graphical object, as displayed on the opaque display component, is modified based on the sensed movement of the physical pointer during the movement of the physical pointer.

18 Claims, 9 Drawing Sheets

(56) References Cited

U.S. PATENT DOCUMENTS

| | | | | |
|---|---|---|---|---|
| 2011/0107270 A1* | 5/2011 | Wang | .................. | G06F 19/3437 715/850 |
| 2012/0113223 A1* | 5/2012 | Hilliges | ................... | G06F 3/00 348/46 |
| 2012/0163021 A1* | 6/2012 | Bohn et al. | .................. | 362/608 |
| 2013/0207896 A1* | 8/2013 | Robinson et al. | ............ | 345/158 |
| 2013/0207937 A1* | 8/2013 | Lutian | .................... | G06F 3/042 345/175 |
| 2013/0265284 A1* | 10/2013 | Yun et al. | .................... | 345/175 |

OTHER PUBLICATIONS

"zSpace: Transforming Ordinary PCs Into Powerful Holographic Workstations", [Online]: Retrieved from the Internet: <http://zspace.com/zspace-overview/, (Accessed Oct. 11, 2013), 4 pgs.
Wakefield, Jane, "TED 2013: SpaceTop 3D See-Through Computer Revealed", BBC News—Technology, (Feb. 27, 2013), 2 pgs.

\* cited by examiner

BEHIND-DISPLAY USER INTERFACE

FIELD

This application relates generally to data processing and, in an example embodiment, a user interface in which at least a portion of the user action occurs behind a user interface display.

BACKGROUND

Technical advances in two-dimensional and three-dimensional graphics design software have allowed even extremely cost-sensitive graphics developers to generate still image and video graphics of high complexity and quality. Given the vast number of graphics functions, effects, options, and the like that a graphics application may now provide, the standard keyboard, video, and mouse user interface is now seen by some as impeding user access to those functions. For example, use of a two-dimensional display screen for viewing a graphical image, in conjunction with a separately-located two-dimensional pointing device, such as a mouse, is sometimes perceived as restricting a user's ability to fully visualize and control a three-dimensional graphical object or image. The use of a touchscreen combining these input and output interface functions may serve to improve the designer's experience by co-locating the manipulation and viewing operations. However, a touchscreen, in and of itself, is inherently a two-dimensional component, thus potentially limiting a designer's ability to create and manipulate a three-dimensional graphical object.

Enhancements to the commonly available types of user interface hardware have been devised in an attempt to provide easier and more intuitive user access to those functions. Typically, these enhancements involve adding one or more specialized cameras, sensors, eyewear, and/or displays to the computing system hosting the graphics software, thus significantly increasing the hardware costs of that system.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Illustrative embodiments, described in greater detail below, include methods and systems for providing a behind-display user interface. In one example, a graphical object is displayed on an opaque display component on a user-facing side of a computing device. Movement of a physical pointer controlled by a user is sensed, wherein the physical pointer is located opposite the user-facing side of the computing device. Further, a representation of the physical pointer is displayed on the display component during the movement of the physical pointer. The graphical object, as displayed on the display component, is modified based on the sensed movement of the physical pointer during the movement of the physical pointer. Thus, in at least some embodiments, the user may operate the computing device as a pseudo-transparent display behind which the user may create, manipulate, and/or otherwise interact with a graphical object in a three-dimensional manner.

In some examples, the computing device may be a tablet computer, a laptop computer, a desktop computer, or the like. Also, the physical pointer may be a hand-held implement, device, or apparatus, such as, for example, a pen-shaped device. In other examples, the physical pointer may be a portion of the body of the user, such as a finger. The computing device may determine the movement of the physical pointer by way of a rear-facing camera, depth sensor, or other device attached to the computing device.

In some examples, the user may utilize the physical pointer to, for example, create a graphical object, edit or modify the object, relocate or reorient the object, and so on. In some implementations, a physical background surface may also be employed as a guide for generating or modifying the object. Additionally, a background surface may be repositioned or reoriented to alter the position or orientation of the graphical object.

The description that follows includes illustrative systems, methods, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
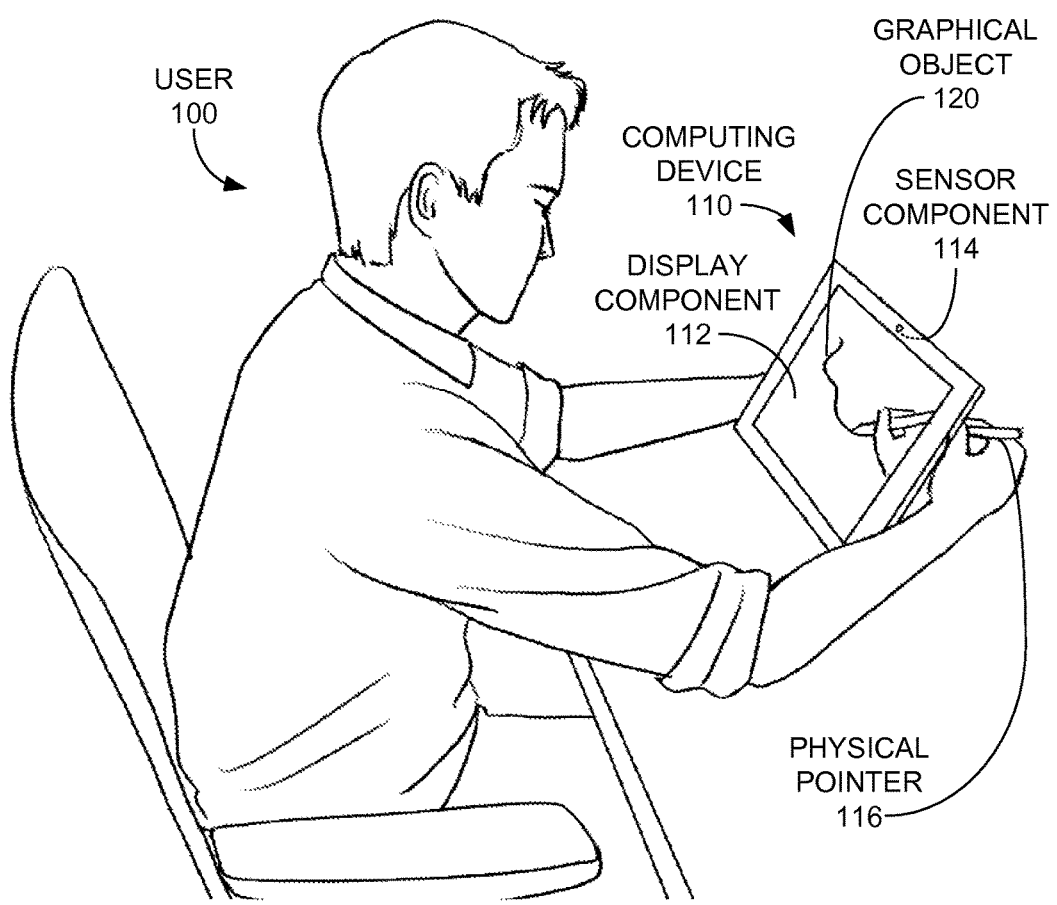
FIG. 1 is a graphical representation of a user utilizing an example computing system for employing example systems and methods for providing a behind-display user interface.

FIG. 1 is a graphical representation of a user 100 utilizing an example computing device 110 for employing example systems and methods for providing a behind-display user interface. In this particular example, the computing device 110 is a tablet computer or similar device, although other devices may be employed in a like manner. The computing device 110 includes a display component 112 and a sensor component 114. The sensor component 114, incorporated into or attached to a rear surface of the computing device 110, senses or tracks the location and/or movement of at least some portion of a physical pointer 116 (e.g., a pen-shaped instrument) controlled by the user 100 behind the computing device (from the perspective of the user 100) to modify a graphical object 120 displayed on the display component 112.

In the example of FIG. 1, by displaying both the physical pointer 116 and the graphical object 120 on the display component 112 to the user 100, the computing device 110 presents an environment to the user 100 in which the graphical object 120 appears to coincide with the location of the physical pointer 116. As a result, the display component 112 serves as a kind of "window" through which the user 100 may view the graphical object 120 and modify the graphical object 120 directly via the physical pointer 116 in a three-dimensional environment.

Figure 2:
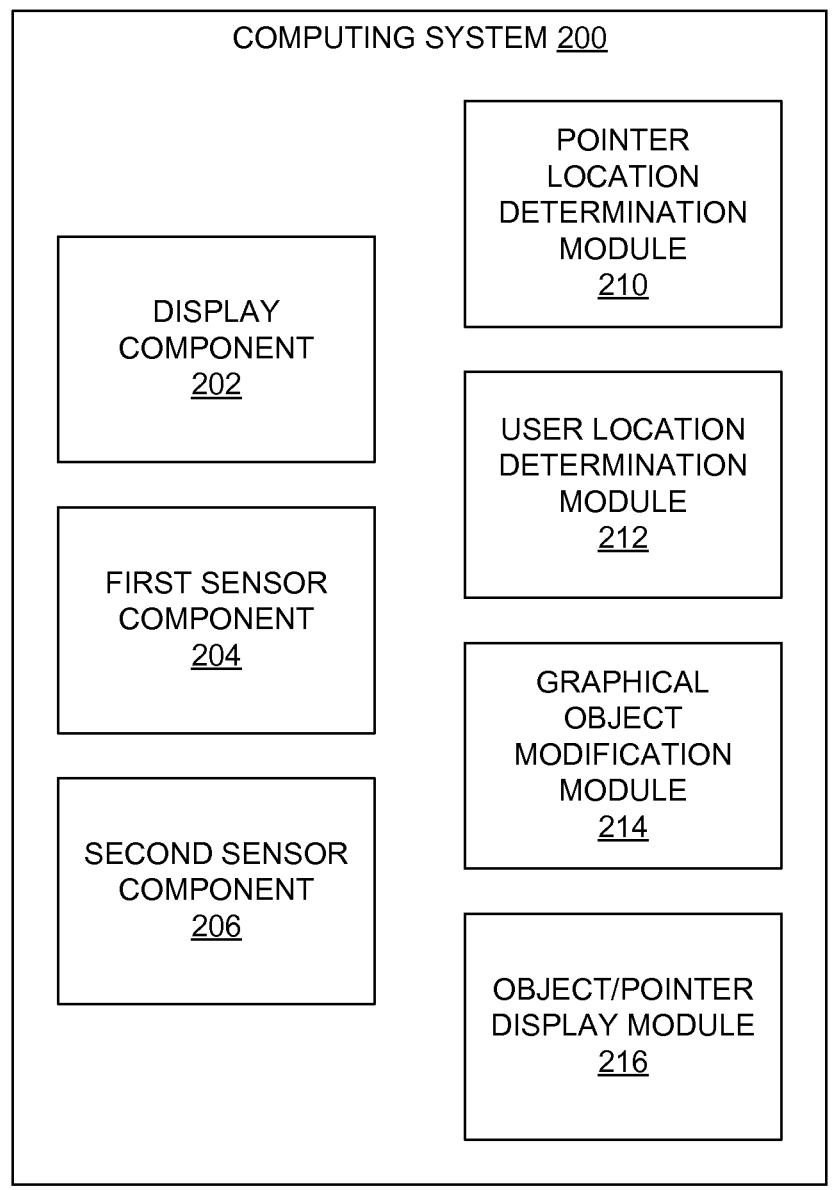
FIG. 2 is a block diagram of an example computing system providing a behind-display user interface.

FIG. 2 is a block diagram of an example computing system 200 providing a behind-display user interface, as described herein. In one implementation, the computing system 200 may serve as the computing device 110 of FIG. 1, although the computing system 200 may applied in other operational environments. In an implementation, the computing system 200 may include a display component 202, a first sensor component 204, a second sensor component 206, a pointer location determination module 210, a user location determination module 212, a graphical object manipulation module 214, and an object/pointer display module 216. Other conventional components that may be included in the computing system 200, such as a power supply, at least one processor, and the like, are not depicted in FIG. 2 to simplify and focus the following discussion. Examples of the computing system 200 may include, but are not limited to, a tablet computer, a laptop computer, a desktop computer, a smart phone, a personal digital assistant (PDA), or any other system capable of performing the various operations described herein in conjunction with the computing system 200. In various examples, some components or modules of FIG. 2 may be combined with others, or subdivided into further components or modules. Also, some of these components or modules may be omitted while others may be added in some implementations.

The display component 202 may be any standard opaque (e.g., non-transparent) display component capable of presenting a moving image to a user. Examples of the display component 202 may include, but are not limited to, a liquid crystal display (LCD) component, a light-emitting diode (LED) component, a cathode ray tube (CRT), a capacitive or resistive touchscreen display, or any other display component capable of displaying a graphical object. The display component 202 is located on what may be termed a user-facing side or surface of the computing system 200. Such terminology may also be used in examples in which the display component 202 is separate from other components of the computing system, as may be the case with a desktop computer.

The first sensor component 204 may be any sensor capable of determining a location and/or movement of a physical pointer, such as a handheld implement, device, or apparatus, or a portion of the body of a user (e.g., a user's finger), when the physical pointer is located opposite the computing system 200 from the user. Examples of the first sensor component 204 may include, but are not limited to, a camera (e.g., a web camera) and a depth sensor. As explained more fully below, the user employs the physical pointer to edit, relocate, reorient, or otherwise modify a graphical object being displayed to the user via the display component 202. In some examples, the first sensor component 204 detects the location or movement of a particular portion of the physical pointer, such as a specific end of the physical pointer. In one example, the first sensor component 204 is incorporated within or attached to a side or surface of the computing system 200 opposite the user-facing side of the computing system 200.

The second sensor component 206 may be employed in some embodiments to detect a location of at least a portion of the user, such as, for example, the head or face of the user. In one example, the computing system 200 may use this location information to modify how a graphical object is displayed on the display component 202 so that the user may view the graphical object from a different angle or perspective by moving his head relative to the display component 202. For example, if the user moves his head to the left, the user may then view more of the left-hand side of the graphical object being displayed via the display component 202. Similarly, the user may view corresponding portions of the graphical object by moving his head to the right, up, or down relative to the display component 202. In one example, the second sensor component 206 may include, but is not limited to, a camera and a depth sensor. Also, the second sensor component 206 may be incorporated within or attached to the user-facing side of the computing system 200.

The modules 210-216 may be implemented in the computing system 200, in some examples, as hardware, software, or some combination thereof. The pointer location determination module 210 may employ the first sensor component 204 to determine one or more locations, orientations, and/or movements of a physical pointer for the purpose of modifying a graphical object as the user intends. The pointer location determination module 210 may also provide images of the physical pointer captured via the first sensor component 204 to the object/pointer display module 216 for display to the user.

The user location determination module 212, in at least some examples, may receive data from the second sensor component 206, and determine the location of the user's head or face relative to the user-facing side or surface of the computing system 200. In one example, the user location determination module 212 may employ facial recognition technology to determine the location of the user's face from the data received from the second sensor component 206. The user location determination module 212 may then forward this location information to the object/pointer display module 216 for altering the display of the graphical object, as mentioned above.

The graphical object modification module 214 may modify or otherwise alter a graphical object being displayed via the display component 202 based on the physical pointer location information provided by the pointer location determination module 210, as well as based on the current virtual location of the graphical object, as displayed via the display component 202. The graphical object modification module 214 may then transfer the resulting information describing the modified graphical object to the object/pointer display module 216.

The object/pointer display module 216 may display the graphical object, as well as the physical pointer, via the display component 202 based on the pointer location information from the pointer location determination module 210 and the information describing the modified graphical object from the graphical object modification module 214. In addition, in some examples, the object/pointer display module 216 may base the display of the graphical object and the physical pointer on head or face location information provided by the user location determination module 212. In one example, the object/pointer display module 216 may present images captured via the first sensor component 204, such as the physical pointer, user's hand, and surrounding visible environment, with the graphical object superimposed thereon. In other implementations, the object/pointer display module 216 may detect and remove some portions of these images, such as the user's hand, before incorporating the graphical object therein and displaying the resulting image via the display component 202. For example, the object/pointer display module 216 may replace the user's hand with background image data obtained during times when the user's hand is not present within the field of view of the first sensor component 204.

Figure 3:
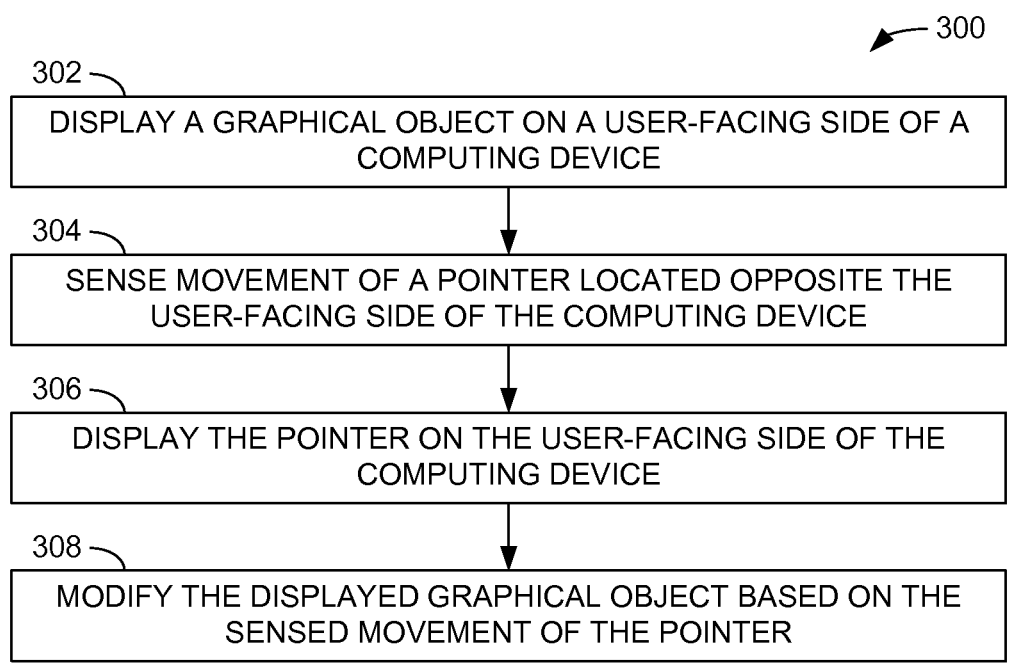
FIG. 3 is a flow diagram illustrating an example method of providing a behind-display user interface.

FIG. 3 is a flow diagram illustrating an example method 300 of providing a behind-display user interface, substantially as described above. While the various operations of the method 300 may be executed on the computing device 110 of FIG. 1 and/or the computing system 200 of FIG. 2, other applications, devices, and/or systems may be employed to perform the method 300 in other embodiments.

In the method 300, a graphical object is displayed on a user-facing side of a computing device or system (operation 302). Movement of a physical pointer located opposite the user-facing side of the computing device is sensed or captured (operation 304). The physical pointer, as captured or sensed, is also displayed on the user-facing side of the computing device (operation 306). The displayed graphical object is modified based on the sensed movement of the physical pointer (operation 308). While operations 302 through 308 of the method 300 of FIG. 3 are shown in a specific order, other orders of operation, including possibly concurrent or continual execution of at least portions of one or more operations, may be possible in some implementations of method 300, as well as other methods discussed herein. For example, the sensing or capture of the movement of the physical pointer (operation 304) may be performed continually, along with the display of the physical pointer (operation 306), as well as the modification (operation 308) and display (operation 302) of the graphical object based on the physical pointer movement.

In other embodiments associated with the method 300, a location of the physical pointer may be sensed or captured, and also displayed on the user-facing side of the computing device. In addition, the displayed graphical object may be modified based on the sensed location of the physical pointer.

Figure 4A:
FIGS. 4A through 4C are graphical representations of an example handheld pointer device having a spherical end employable in example systems and methods for providing a behind-display user interface.
Figure 4B:
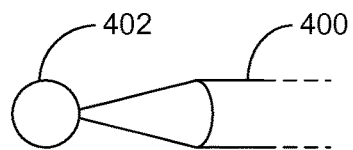
Figure 4C:
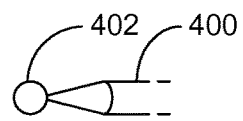

FIGS. 4A through 4C are graphical representations of an example handheld pointer device 400 having a spherical end 402 employable in example systems and methods for providing a behind-display user interface. In this example, the use of the spherical end 402, as shown in FIG. 4A, may facilitate easier or faster sensing or capture of its location by the computing system 200, which, in turn, may determine the type and/or magnitude of modification to be imparted to a graphical object. Detection of the location or movement of the spherical end 402 may also be enhanced by shading or coloring the spherical end 402 to provide a greater visual contrast between the spherical end 402 and a background surface located behind the spherical end 402 from the perspective of the computing system 200.

FIGS. 4B and 4C depict how the apparent size of the spherical end 402 of the handheld pointer device 400 indicates the distance of the spherical end from the computing system 200. More specifically, FIG. 4B depicts a larger apparent spherical end 402 than that illustrated in FIG. 4A, indicating that the spherical end of FIG. 4B is closer to the computing system 200 than that of FIG. 4A. Oppositely, FIG. 4C depicts a smaller apparent spherical end 402 than that illustrated in FIG. 4A, indicating that the spherical end of FIG. 4C is farther from the computing system 200 than that of FIG. 4A. In at least some embodiments, the computing system 200 may determine the apparent size of the spherical end 402 to determine how far away the spherical end 402 is located from the computing system 200. Combining such information with information indicating where within the field of view the spherical end 402 is located, the computing system 200 may determine location and movement information of the spherical end 402 within a three-dimensional area behind the computing system 200, from the perspective of the user.

FIGS. 5A through 5F are graphical representations of an example handheld pointer device 500 (or, more simply, a handheld pointer 500) having a conical end 502 employable in example systems and methods for providing a behind-display user interface. The handheld pointer 500 may be, in some examples, a simple pen, a standard pencil, a mechanical pencil, a pen-shaped pointer, or the like. As described in greater detail below, the use of the conical end 502 may facilitate detection of both the distance of the conical end 502 from the computing system 200, as well as the orientation of the handheld pointer 500 relative to the computing system 200, which the computing system 200 may utilize to determine the type and/or magnitude of the modification of the graphical object intended by the user. As with the spherical end 402, detection of the location or movement of the conical end 502 may also be enhanced by shading or coloring the conical end 502 to provide a greater visual contrast between the conical end 502 and a background surface located behind the conical end 502 from the perspective of the computing system 200.

The computing system 200 may determine both the distance of the conical end 502 from the computing system 200 and the orientation of the conical end 502 relative to the computing system 200 by ascertaining the apparent size of the conical end 502, the apparent shape of the conical end 502, and the apparent direction indicated by the conical end 502. For example, FIG. 5B depicts the conical end 502 appearing larger than that of FIG. 5A, but with the same shape and direction, thus indicating that the conical end of FIG. 5B is closer to the computing system 200 than that of FIG. 5A. Oppositely, FIG. 5C depicts the conical end 502 appearing smaller than that of FIG. 5A, but with the same shape and direction, thus indicating that the conical end of FIG. 5C is farther from the computing system 200 than that of FIG. 5A.

Figure 5A:
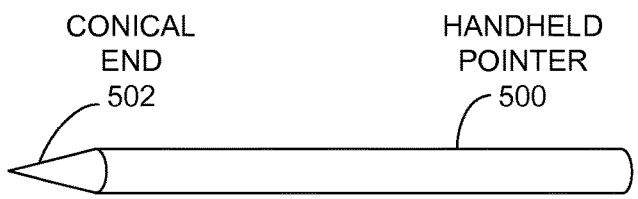
FIGS. 5A through 5F are graphical representations of an example handheld pointer device having a conical end employable in example systems and methods for providing a behind-display user interface.
Figure 5B:
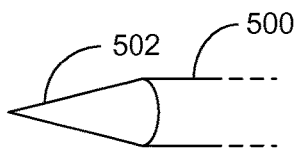
Figure 5C:
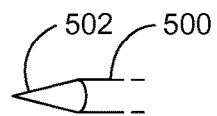
Figure 5D:
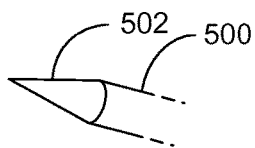

In FIG. 5D, the apparent size and shape of the conical end 502 shown therein are the same as that of FIG. 5A, but the conical end 502 is oriented differently from that shown in FIG. 5A. As a result, the conical end 502 of FIG. 5D is the same distance from the computing system 200 as that of FIG. 5A, but indicates a different direction parallel to the computing device 200, which may indicate a different modification of a graphical object from the scenario of FIG. 5A.

Figure 5E:
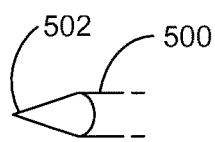
Figure 5F:
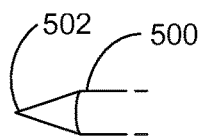

FIGS. 5E and 5F depict situations in which the apparent shape of the conical end 502 differs from that of FIGS. 5A through 5D. In FIG. 5E, the conical end 502 is directed toward the computing system 200, while the conical end of FIG. 5F is directed away from the computing system 200. In one example, the computing system 200 may ascertain the orientation of the conical end 502 based on the apparent shape of the conical end 502. Also, the computing system 200 may employ the apparent size of the conical end 502, taking into account the apparent shape of the conical end 502, to determine the distance of the conical end 502 from the computing system 502.

Figure 6A:
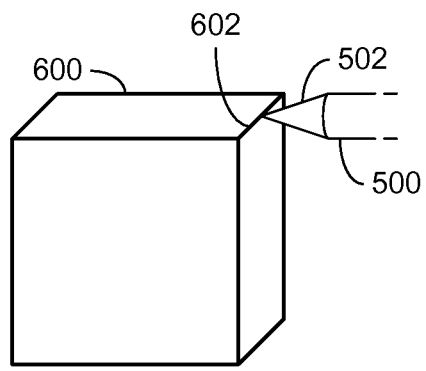
FIGS. 6A and 6B are graphical representations of a change of orientation of a graphical object using a behind-display user interface.
Figure 6B:
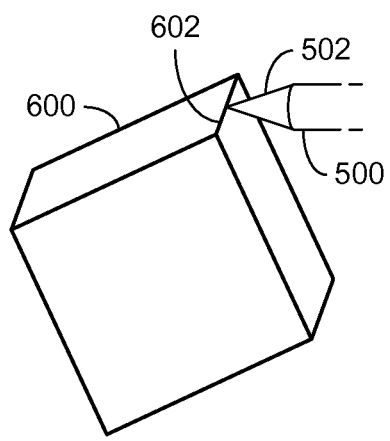

FIGS. 6A, 6B, 7A, and 7B depict situations in which the conical end 502 of the handheld pointer 500 of FIGS. 5A through 5F is employed by a user to modify a graphical object. For example, FIGS. 6A and 6B are graphical representations of a change of orientation of a graphical object 600. In FIG. 6A, the user has aligned a tip of the conical end 502 with an edge 602 of the graphical object 600. By then lifting up the edge 602 of the graphical object 600 with the conical end 502, as shown in FIG. 6B, the graphical object 600 is reoriented accordingly. In some examples, the user may provide additional inputs, such as via the computing system 200 or the handheld device 500, to indicate to the computing system 200 that the user intends to perform a reorientation of the graphical object 600 by the lifting of the edge 602 using the conical end 502.

Figure 7A:
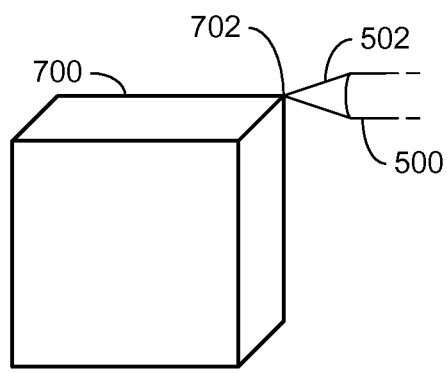
FIGS. 7A and 7B are graphical representations of a change of shape of a graphical object using a behind-display user interface.
Figure 7B:
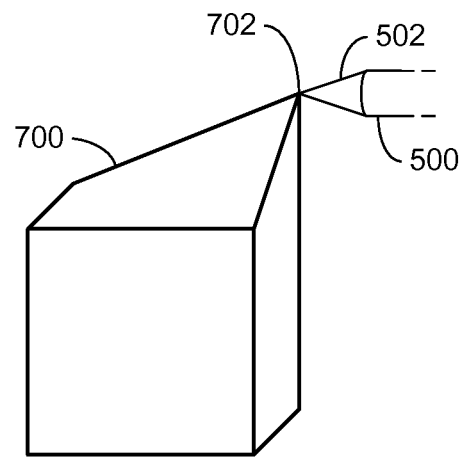

FIGS. 7A and 7B are graphical representations of a change of shape of a graphical object 700 using the conical end 502. In FIG. 7A, the user has contacted a corner 702 of the graphical object 700 using the conical end 502. By then lifting up the corner 702 with the conical end 502, the corner 702 is lifted while the remaining vertices of the graphical object 700 remain in place. As a result, a portion of the graphical object 700 is "stretched." As with FIGS. 6A and 6B, the user may apply an additional input, such as via the computing system 200 or the handheld device 500, to indicate that a stretching operation (as opposed to the reorientation operation shown in FIGS. 6A and 6B) is desired.

While FIGS. 6A, 6B, 7A, and 7B address only reorientation and stretching operations, other types of graphical operations, such as adding one or more features to a graphical object, removing one or more features of a graphical object, relocating a graphical object, resizing a graphical object, and so on, are also possible by use of the handheld pointer 500. In addition, the user may configure or adjust these various operations by providing additional input via the computing system 200 (e.g., by keyboard input, by touchscreen input, by voice input, and so on) or by way of one or more buttons on the handheld pointer 500, wherein the handheld pointer 500 may be communicatively coupled to the computing system 200 by way of a wired interface (e.g., Universal Serial Bus (USB)) or a wireless interface (e.g., Bluetooth®). For example, when drawing or creating a graphical object, the user may provide an input to change a line color, line width, or other aspect of the graphical object creation function.

Many different graphical object-related functions that may be applied to a graphical object by way of the handheld pointer 500 may include, but are not limited to, drawing at least a portion of the graphical object "in the air," on paper, or on a table; sculpting the graphical object; moving and/or rotating the graphical object; and creating a object model, such as by drawing or creating one or more primitive objects, including, but not limited to, polygons, spheres, cubes, cones, and the like.

In one example, to generate a particular graphical object or model, the user may trace a physical object to be modeled or duplicated (e.g., a coffee cup) using the handheld pointer 500. After this initial modeling is complete, the user may then employ the handheld pointer 500 to resize, reorient, relocate, paint, and perform other functions to modify the traced graphical object.

Additionally, the user may use the handheld pointer to "spray" a virtual "gel" material to create at least a portion of a graphical object. For example, using an additional input from the user to initiate the spraying process, the user may move the handheld pointer 500 as the spraying proceeds to generate an elongate graphical object, or the user may maintain the location of the handheld pointer 500 while spraying to generate a graphical object that increases in size while spraying. Further, the user may "spray" or "brush" a virtual "paint" to color a graphical object.

In some embodiments, the graphical object or model may possess one or more joints such that the user may use the handheld pointer 500 to alter a "pose" of the graphical object or model by selecting and moving one or more portions of the graphical object or model. Performing multiple such operations in serial fashion may thus result in animation of the graphical object.

In other examples, the computing system 200 may be configured to react to the use of two handheld pointers 500, wherein each of the handheld pointers 500 performs one or more separate functions, either at separate times or concurrently. For example, one handheld pointer 500 may be used to create or draw the graphical object, while another is used to relocate and/or orient the graphical object. In one implementation, the handheld pointers 500 may be distinguished by color, shape, or other characteristics of the handheld pointers 500.

Figure 8:
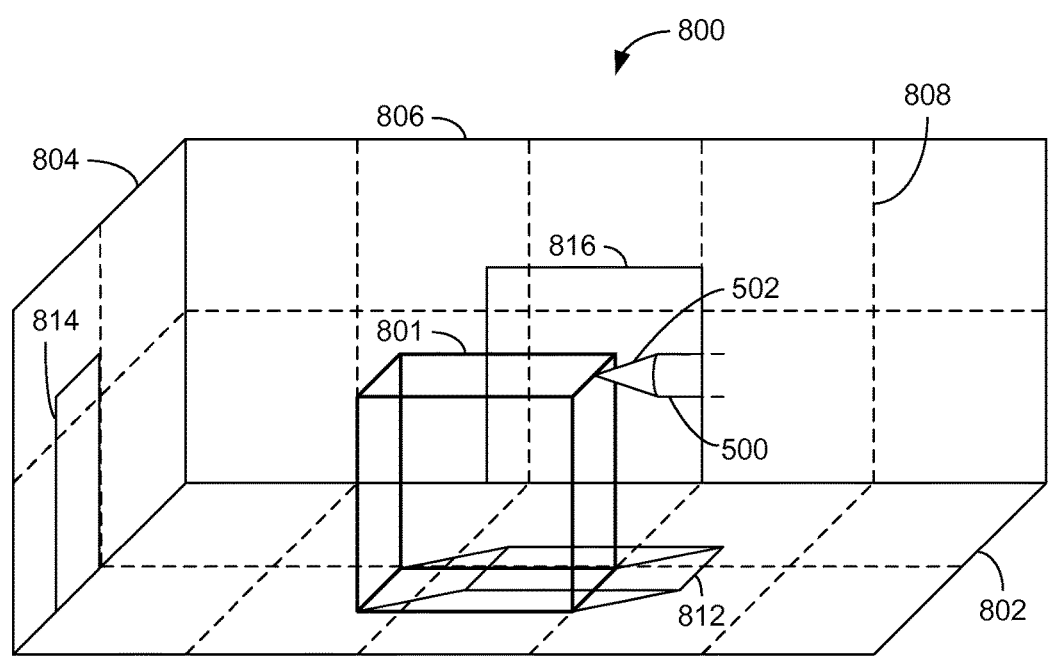
FIG. 8 is a graphical representation of a graphical object displayed in a behind-display user interface in relation to a background surface.

FIG. 8 is a graphical representation of a graphical object 801 displayed in a behind-display user interface in relation to a physical background surface 800 physically located behind the handheld pointer 500 from the perspective of the user. In this example, the user may employ the background surface 800 to provide a guide for the user when generating or otherwise modifying the graphical object 801. As shown in FIG. 8, the background surface 800 includes a bottom surface 802, a side surface 804, and a back surface 806, as displayed to the user. In other examples, one or more of the surfaces 802, 804, and 806 may be omitted. In some implementations, the physical background surface 800 is portable and may be fashioned from paper, cardboard, or some other material. Also shown is a graphical object 801, which the user is in the process of creating or modifying by way of the handheld pointer 500. In this example, each of the surfaces 802, 804, and 806 exhibits guidelines 808 that provide the user with a visual guide for creating or modifying the graphical object 801. In other examples, other types of visual cues, such as boxes, circles, and other printed shapes, may be provided on the surfaces 802, 804, and 806.

In addition to presenting the graphical object 801 to the user in conjunction with the background surface 800, the computing system 200 may also provide one or more virtual "shadows" 812, 814, and 816 cast by the graphical object 801 onto the surfaces 802, 804, and 806, respectively, thus showing the size, location, and orientation of the graphical object 801 in three dimensions. In some implementations, the computing system 200 may generate the shadows 812, 814, and 816 by assuming one or more virtual light sources positioned opposite the graphical object 801 from the surfaces 812, 814, and 816. These shadows may provide further visual clues to the user regarding the size, position, orientation, and other factors of the graphical object 801 being displayed. In some examples, the computing system 200 may allow the user to specify the location of the virtual light sources.

In some examples, the user may actually draw at least part of the graphical object 801 on one or more of the surfaces 802, 804, and 806, or on another surface not depicted in FIG. 8, using the handheld pointer 500, such as a pen or pencil. The resulting drawing on such a surface may then be captured as the graphical object 801, which the user may then modify as described above.

Figure 9A:
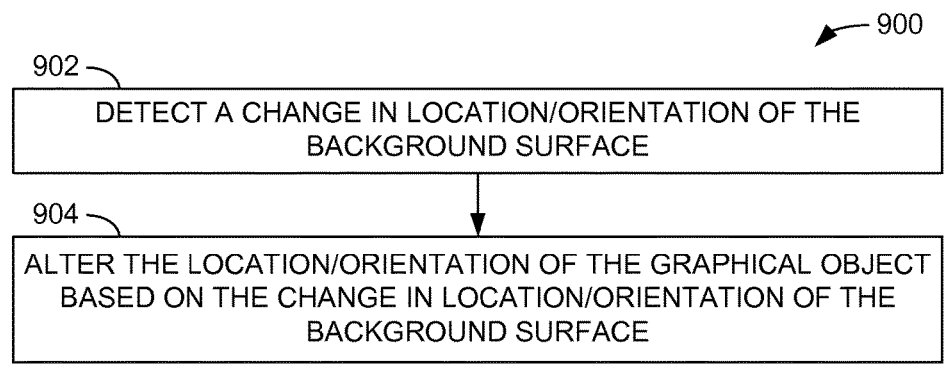
FIG. 9A is a flow diagram of an example method of altering a location and/or orientation of a graphical object based on a change of location and/or orientation of a background surface.

In addition, a background surface, such as surface 800 of FIG. 8, may be used to relocate and/or reorient a graphical object without the user employing the physical pointer 500. For example, FIG. 9A is a flow diagram of an example method 900 of altering a location and/or orientation of a graphical object based on a change of location and/or orientation of a background surface. In the method 900, a change in the location and/or orientation of the background surface is detected (operation 902). Based on that change, the location and/or orientation of the graphical object is altered (operation 904). For example, the location and/or orientation of the graphical object is altered to maintain its distance from, and orientation relative to, the background surface.

Figure 9B:
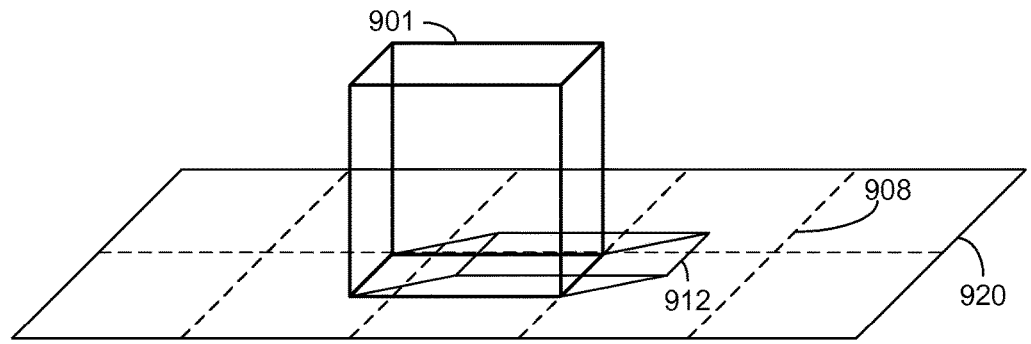
FIGS. 9B and 9C are graphical representations of altering a location and/or orientation of a graphical object based on a change of location and/or orientation of a background surface.
Figure 9C:
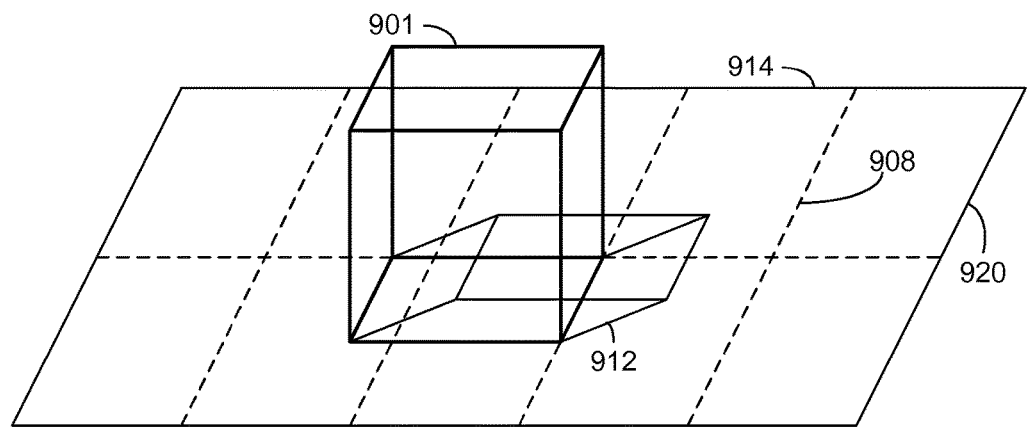

FIGS. 9B and 9C are graphical representations of altering a location and/or orientation of a graphical object 901 based on a change of location and/or orientation of a background surface 920, as is provided by the method 900 of FIG. 9A. In FIG. 9A, the graphical object 901 is depicted as virtually sitting atop the background surface 920, which exhibits multiple guidelines 908. Also shown is a virtual shadow 912 cast by an assumed light source, as described earlier with respect to FIG. 8.

As shown in FIG. 9B, a user may modify the location and/or orientation of the graphical object 901 relative to the display component 202 by manually moving or altering the orientation of the background surface 920. In this particular example, the user has raised a rear edge 914 of the background surface 920 by hand, thus causing the representation of the graphical object 901 to be relocated and reoriented such that the graphical object 901 maintains its distance and orientation relative to the background surface 920. In other examples, the background surface 920 may be relocated closer to or further from the computing system 200, rotated about any axis, or adjusted in some other manner to modify the displayed representation of the graphical object 901 in a corresponding manner. In some implementations, the computing system 200 utilizes the guidelines 908 of the background surface 920 to determine the location and orientation changes of the background surface 920 to relocate and/or reorient the graphical object 901 accordingly.

In some examples, the computing system 200 may receive additional user input, such as by way of the computing system 200 itself or a handheld pointer, indicating when the location and orientation of the graphical object 901 should be coupled to the background surface 920, and when the graphical object 901 should be uncoupled from the background surface 920, thus remaining motionless when the background surface 920 is repositioned, or even removed from view.

In a related example, the user may retrieve or capture a two-dimensional image (e.g., a photograph using a camera of the computing system 200) of a subject, such as a physical object or a person, and then employ the background surface 920 to relocate or reorient the captured image, thus possibly altering at least one of a location, an apparent size, and a visual perspective of the captured image. In some examples, the user may apply the captured image of the subject, or a portion thereof, to a surface of a graphical object for subsequent processing, as discussed above.

In yet another implementation, the user may capture a series of images of a subject from multiple perspectives along a horizontal plane that includes the subject. The user, using the computing system 200, may then logically apply or associate each of these images to a particular perspective or relative angle of the background surface 920. The user may then rotate the background surface 920 about a vertical axis, left and right, to view the images in succession, thus providing multiple perspectives of the subject while the user alters the orientation of the background surface 920. In other examples, the series of images may instead represent an animation sequence of a subject or scene, in which each image is taken at a different point in time. By associating each of these images with a particular orientation of the background surface 920 relative to the computing system 200, the user may rotate the background surface 920 to view the animation sequence.

In another embodiment, instead of employing the background surface 920 on which to draw graphical objects, or on which to manipulate such objects, as described above, the user may employ a second computing system, such as a second tablet computer or a smartphone, as a replacement for the background surface 920. The user may draw or otherwise create the graphical object on the second computing system. The first computing system 200 may then capture the graphical element from the display of the second computing system to facilitate modification of the graphical object. In some examples, the second computing system may display guidelines similar to those of the background surface 920 of FIGS. 9B and 9C to facilitate the drawing of the graphical object and the manipulation of the graphical object, as described above. In another implementation, the second computing system may transmit gyroscopic data or other data describing an orientation of the second computing system to the first computing system (e.g., via a Bluetooth® connection) so that the computing system may determine the relative orientation of the second computing device to the first computing system 200 to properly capture the graphical image. In one particular example, the second computing device may be a pressure-sensitive graphics tablet, such as one manufactured by Wacom, Co., Ltd. of Otone, Saitama, Japan, as such a device may allow the user to create a complex, nuanced graphical object prior to manipulating or modifying the object further via the first computing system 200.

Figure 10:
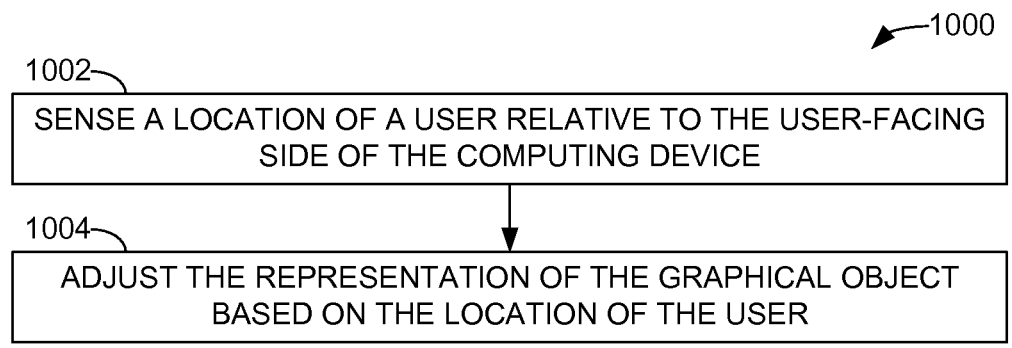
FIG. 10 is a flow diagram of an example method of adjusting a representation of a graphical object on a display based on a location of a user.

FIG. 10 is a flow diagram of an example method 1000 of adjusting a representation of a graphical object on a display based on a location of a user, as mentioned above with respect to the second component sensor component 206 and the user location determination module 212 of the computing system of FIG. 2. In the method 1000, a location of a user (e.g., the face or head of the user) is sensed relative to a user-facing side of the computing system 200 (operation 1002). Based on the sensed location, the presentation of the graphical object may be adjusted (operation 1004). For example, in response to the user moving his head in a particular direction, the representation of the displayed graphical object may be rotated and/or relocated in a commensurate direction to produce a three-dimensional experience for the user. Such a capability may enhance the user's understanding of the size, shape, and other aspects of the graphical object being viewed.

As a result of at least some of the embodiments described above, the user may interact more directly with a graphical object while creating or modifying that object, as the three-dimensional physical location of the user interaction and the virtual location of the graphical object appear to the user to be coincident, thus facilitating a more intuitive and user-friendly interface. While the discussion presented above focuses on the creation and modification of three-dimensional images, two-dimensional images may be created and modified using these same techniques. In addition, readily available equipment, such as a tablet, laptop, or desktop computer with a rear-facing camera or similar device, may be employed to provide the behind-display interface described herein, without the need of specialized electronic components.

While the embodiments described above focus on graphical objects generated by way of graphics design software, the various aspects of these embodiments may also be applied to other computer-related functions involving graphical objects, such as, for example, file and file folder access, execution of applications, computer system configuration, and so on.

Figure 11:
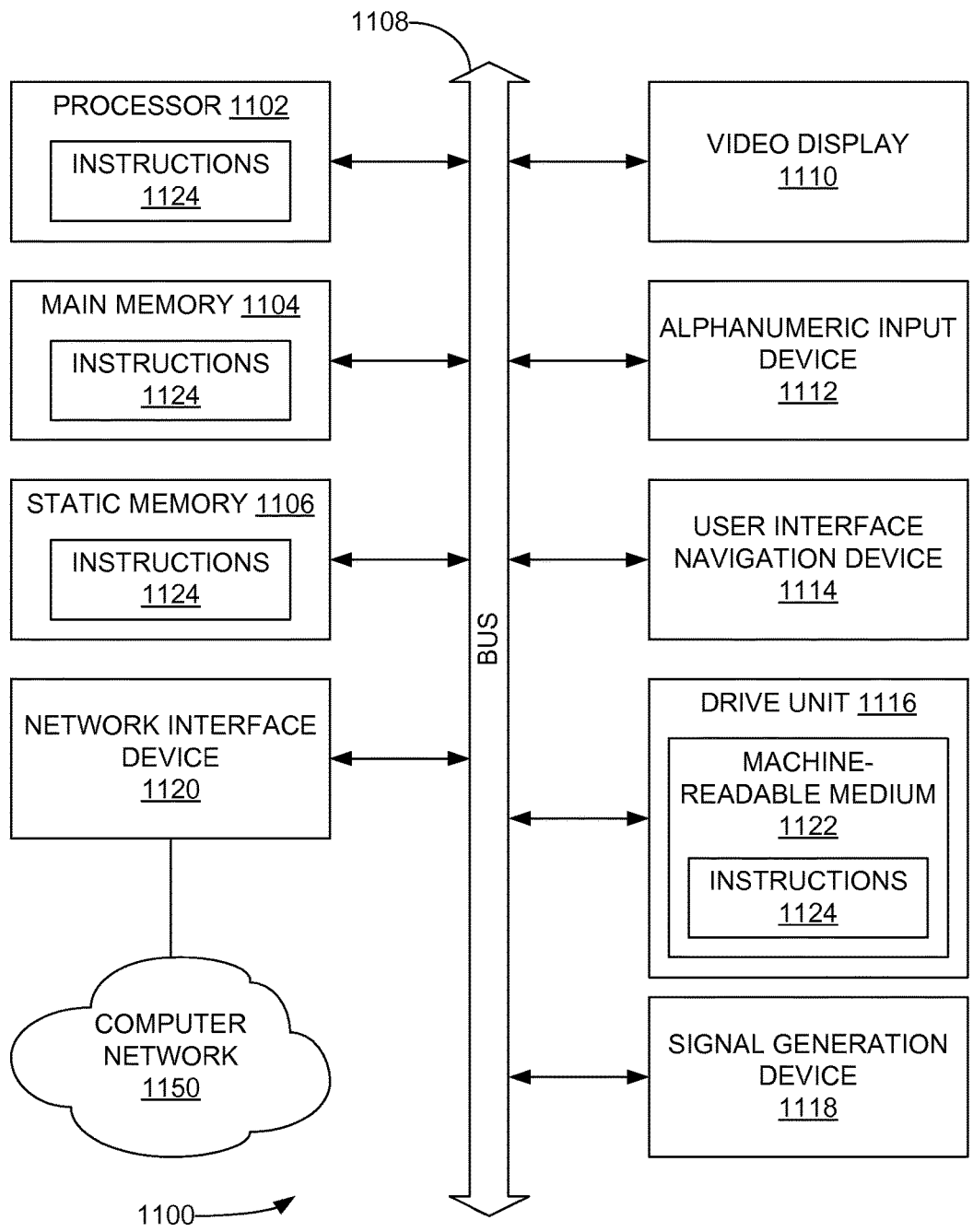
FIG. 11 is a block diagram of a machine in the example form of a processing system within which may be executed a set of instructions for causing the machine to perform any one or more of the methodologies discussed herein.

FIG. 11 depicts a block diagram of a machine in the example form of a processing system 1100 within which may be executed a set of instructions 1124 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1100 includes a processor 1102 (e.g., a central processing unit (CPU), a graphics processing unit (GPU), or both), a main memory 1104 (e.g., random access memory), and static memory 1106 (e.g., static random-access memory), which communicate with each other via bus 1108. The processing system 1100 may further include video display unit 1110 (e.g., a plasma display, a liquid crystal display (LCD), or a cathode ray tube (CRT)). The processing system 1100 also includes an alphanumeric input device 1112 (e.g., a keyboard), a user interface (UI) navigation device 1114 (e.g., a mouse), a disk drive unit 1116, a signal generation device 1118 (e.g., a speaker), and a network interface device 1120.

The disk drive unit 1116 (a type of non-volatile memory storage) includes a machine-readable medium 1122 on which is stored one or more sets of data structures and instructions 1124 (e.g., software) embodying or utilized by any one or more of the methodologies or functions described herein. The data structures and instructions 1124 may also reside, completely or at least partially, within the main memory 1104, the static memory 1106, and/or within the processor 1102 during execution thereof by the processing system 1100, with the main memory 1104, the static memory 1106, and the processor 1102 also constituting machine-readable, tangible media.

The data structures and instructions 1124 may further be transmitted or received over a computer network 1150 via network interface device 1120 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 1100) or one or more hardware modules of a computer system (e.g., a processor 1102 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 1102 or other programmable processor) that is temporarily configured by software to perform certain operations. It will be appreciated that the decision to implement a hardware module mechanically, in dedicated and permanently configured circuitry, or in temporarily configured circuitry (for example, configured by software), may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 1102 that is configured using software, the general-purpose processor 1102 may be configured as respective different hardware modules at different times. Software may accordingly configure a processor 1102, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (for example, a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1102 or processor-implemented modules. The performance of certain of the operations may be distributed among the one or more processors 1102, not only residing within a single machine but deployed across a number of machines. In some example embodiments, the processors 1102 may be located in a single location (e.g., within a home environment, within an office environment, or as a server farm), while in other embodiments, the processors 1102 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of providing a user interface, the method comprising:
    displaying, on an display component on a user-facing side of a computing device, a representation of a three-dimensional graphical object;
    determining, using a camera of the computing device, a first apparent size and a first apparent direction of a portion of the physical pointer at a first point in time, wherein the physical pointer is controlled by a user and located opposite the user-facing side of the computing device;
    determining, using the camera of the computing device, a second apparent size and a second apparent direction of the portion of the physical pointer at a second point in time;
    sensing movement of the physical pointer based at least in part on a difference in magnitude between the first apparent size and the second apparent size of the portion of the physical pointer and a difference between the first apparent direction and the second apparent direction of the portion of the physical pointer, wherein the movement includes at least a variance in an orientation of the physical pointer;
    displaying, on the opaque display component, a representation of the physical pointer, captured by the camera, during the movement of the physical pointer; and
    updating, as displayed on the display component, the representation of the three-dimensional graphical object, based on the sensed movement of the physical pointer during the movement of the physical pointer, wherein updating the representation of the three-dimensional graphical object includes at least a modification to a shape of the representation of the three-dimensional graphical object that includes modifying a distance between a first corner and a second corner of the three-dimensional graphical object such that the modified shape is stretched relative to the unmodified shape of the representation of the three-dimension graphical object and a type of the modification is based on the variance in the orientation of the physical pointer.

2. The method of claim 1, wherein the physical pointer comprises a hand-held device being controlled by the user.

3. The method of claim 1, wherein the physical pointer comprises a portion of a body of the user.

4. The method of claim 1, wherein the camera is a first camera, the method further comprising:
    sensing, using a second camera of the computing device, a location of the user relative to the user-facing side of the computing device; and
    adjusting the representation of the three-dimensional graphical object, as displayed on the display component, based on the sensed location of the user relative to the user-facing side of the computing device.

5. The method of claim 1, further comprising:
    determining, using the camera of the computing device, a first apparent shape of the portion of the physical pointer at the first point in time; and
    determining, using the camera of the computing device, a second apparent shape of the portion of the physical pointer at the second point in time, and
        wherein sensing movement of the physical pointer is based further on a change in shape of the physical pointer between the first apparent shape and the second apparent shape.

6. The method of claim 1, wherein sensing the movement of the physical pointer is based further on a plurality of marks visible on a background surface that is positioned opposite the physical pointer from the computing device.

7. The method of claim 6, further comprising:
    detecting a change in location or a change in orientation of the background surface relative to the computing device; and
    altering, as displayed on the display component, at least one of an apparent location of the representation of the three-dimensional graphical object or an apparent orientation of the representation of the three-dimensional graphical object based on the detected change in location or change in orientation of the background surface relative to the computing device.

8. The method of claim 7, wherein detecting the change in location or change in orientation of the background surface is based on detecting movement of the plurality of marks visible on the background surface.

9. The method of claim 1, further comprising:
displaying, on the display component, a virtual shadow cast by the representation of the three-dimensional graphical object onto a representation of a physical background surface captured by the camera.

10. A non-transitory computer-readable storage medium comprising instructions that, when executed by at least one processor of a computing device, cause the computing device to perform operations comprising:
displaying, on an display component on a user-facing side of the computing device, a representation of a graphical object;
determining, using a camera of the computing device, a first apparent size and a first apparent shape of a portion of a physical pointer at a first point in time, wherein the physical pointer is controlled by a user and located opposite the user-facing side of the computing device;
determining, using the camera of the computing device, a second apparent size, and a second apparent shape of the portion of the physical pointer at a second point in time;
sensing movement of the physical pointer based at least in part on a difference in magnitude between the first apparent size and the second apparent size of the portion of the physical pointer, difference between the first apparent direction and the second apparent direction of the of the physical pointer, and a difference between the first apparent shape and the second apparent shape of the portion of the physical pointer, wherein the movement includes at least a variance in orientation of the physical pointer;
displaying, on the display component, a representation of the physical pointer, captured by the camera, during the movement of the physical pointer; and
updating, as displayed on the display component, the representation of the graphical object based on the sensed movement of the physical pointer during the movement of the physical pointer, wherein updating the representation of the graphical object includes at least a modification to shape of the representation of the graphical object that includes modifying a distance between a first corner and a second corner of the three-dimensional graphical object such that the modified shape is stretched relative to the unmodified shape of the representation of the three-dimension graphical object and a type of the modification is based on the variance in the orientation of the physical pointer.

11. The storage medium of claim 10, wherein the physical pointer comprises a hand-held device being controlled by the user.

12. The storage medium of claim 10, wherein the physical pointer comprises a portion of a body of the user.

13. The storage medium of claim 10, wherein the camera is a first camera, the operations further comprising:
sensing, using a second camera of the comprising device, a location of the user relative to the user-facing side of the computing device; and
adjusting the representation of the three-dimensional graphical object, as displayed on the opaque display component, based on the sensed location of the user relative to the user-facing side of the computing device.

14. A computing device comprising:
an display component on a user-facing side of the computing device;
a camera;
at least one processor; and
memory having instructions stored thereon that, when executed by the at least one processor, cause the computing device to:
display, on the display component, a representation of a three-dimensional graphical object;
determine, using the camera, a first apparent size of a portion of a physical pointer at a first point in time, wherein the physical pointer is controlled by a user and located opposite the user-facing side of the computing device;
determine, using the camera of the computing device, a second apparent size of the portion of the physical pointer at a second point in time;
detect movement of the physical pointer based at least in part on a difference in magnitude between the first apparent size and the second apparent size, wherein the movement includes at least a variance in orientation of the physical pointer;
display, on the display component, a representation of the physical pointer, captured by the camera, with respect to the representation of the three-dimensional graphical object during the movement of the physical pointer; and
modify at least a shape of the representation of the three-dimensional graphical object based on the variance in orientation of the physical pointer during the movement of the physical pointer, wherein modifying the shape of the representation of the three-dimensional graphical object includes modifying a distance between a first corner and a second corner of the three-dimensional graphical object such that the modified shape is stretched relative to the unmodified shape of the representation of the three-dimension graphical object.

15. The computing device of claim 14, wherein to detect, movement of the physical pointer is further based on a plurality of marks visible on a background surface that is positioned opposite the physical pointer from the computing device.

16. The computing device of claim 14, wherein when executed by the at least one processor, the instructions further cause the computer device to:
determine, using the camera, a first apparent direction of the portion of the physical pointer relative to the computing device and at the first point in time;
determine, using the camera, a second apparent direction of the portion of the physical pointer relative to the computing device and at the second point in time; and
detect the movement of the physical pointer further based on a difference between the first apparent direction and the second apparent direction of the portion of the physical pointer relative to the computing device, such that the variance in the orientation of the physical pointer includes the difference between the first apparent direction and the second apparent direction of the portion of the physical pointer relative to the computing device.

17. The computing device of claim 14, wherein when executed by the at least one processor, the instructions further cause the computing device to:
determine, using the camera, a first apparent shape of the portion of the physical pointer at the first point in time;

determine, using the camera, a second apparent shape of the portion of the physical pointer at the second point in time; and detect the movement of the physical pointer further based on a difference between the first apparent shape and the second apparent shape of the portion of the physical pointer, such that the variance in the orientation of the physical pointer includes the difference between the first apparent shape and the second apparent shape of the portion of the physical pointer.

18. The computing device of claim 14, wherein when executed by the at least one processor, the instructions further cause the computing device to:

modify at least one of a position or an orientation of the representation of the three-dimensional graphical object based on the variance in orientation of the physical pointer during the movement of the physical pointer.

* * * * *